Aug. 15, 1944.  J. A. HAASE  2,355,644
BALE TIE
Filed July 31, 1941  5 Sheets-Sheet 1

INVENTOR.
Jesse A. Haase,
BY
Hood & Hahn
ATTORNEYS

INVENTOR.
Jesse A. Haase,
BY Hood & Hahn
ATTORNEYS

INVENTOR.
JESSE A. HASSE,
BY
Hood & Hahn
ATTORNEYS.

Aug. 15, 1944.  J. A. HAASE  2,355,644
BALE TIE
Filed July 31, 1941  5 Sheets-Sheet 5

INVENTOR.
JESSE A. HAASE,
BY Hood & Hahn.
ATTORNEYS.

Patented Aug. 15, 1944

2,355,644

UNITED STATES PATENT OFFICE 2,355,644

BALE TIE

Jesse A. Haase, Martinsville, Ind.

Application July 31, 1941, Serial No. 404,880

15 Claims. (Cl. 100—20)

The present invention relates to improvements in baling machines primarily adapted for baling hay, straw, and like material.

One of the objects of the present invention is to provide a baler which, during the formation of the bale, will automatically embrace the bale with binding wires and, upon the completion of the bale, will automatically tie the wires before the bale is delivered from the machine.

Another object of my invention is to provide an improved bale wire tying machine which automatically will tie the free ends of the binding wire or wires which have been passed around the bale and upon the completion of the tie, sever the tied wires from the source of supply.

For the purpose of disclosing my invention, I have illustrated an embodiment thereof in the accompanying drawings, in which:

Fig. 13 is a detail of the wire needle;

In the embodiment of the invention illustrated, there is provided a baling chamber 1, preferably formed of a plurality of spaced apart side panels or bars 2. These bars or panels 2 are sufficiently spaced apart vertically to provide interstices 3 therebetween, which permit the passage therethrough of the baling wire and the bale wire needles.

The baling chamber likewise is provided with a top and bottom, whereby a substantially closed chamber is provided into which the material to be baled, is fed. Preferably the side members 2, as well as, if desired, the tops and bottoms, are provided with inturned forwardly inclined spurs 4 which, while permitting the passage of the material to be baled forwardly, will act as a preventer means for restraining the backward movement of the material after it has once been pushed forward into the chamber. The material is compressed in the baling chamber 1 through the medium of a baling plunger 5 driven from a suitable reciprocating plunger 6 operated from the main drive wheels 7, which in turn are driven by any suitable means, such as a gasoline engine or other power delivery device. The material is delivered into the baling chamber 1 from a precompression chamber 8 into which the material may be fed by any suitable means through a suitable side opening, rearwardly facing, in the precompression chamber. This precompression chamber is provided with a transversely reciprocating plunger, not shown, which forces the material from the precompression chamber into the baling chamber in advance of each of the reciprocating strokes of the plunger 5, suitable means being provided for cutting off the supply of material in the precompression chamber from the source of supply before it is fed into the baling chamber.

In order to automatically bind the bale, as it is being formed, with a binding wire, I provide a means whereby a plurality of strands of wire, in the present instance three, are initially stretched across the baling chamber in advance of the feeding of material therein. These wires are gripped on the "far" side of the chamber and, as the material is pushed forward in the formation of the bale, the wire automatically feeds forward with the material from the "near" side of the machine, thus surrounding the bale with the binding wires as the bale is formed. To this end, I provide a plurality of wire grippers, three in number, and as each of the wire grippers and its cooperating wire tie and needle are of the same construction, a description of one set of these parts will be sufficient.

On the far side of the baling chamber, (see Figs. 1, 2, and 3) there is provided an oscillating frame comprising a vertical supporting rod 10 connected at its top and bottom to oscillating levers 11 pivoted at 12 on stub shafts mounted on the top and bottom of the compression chamber. The lever 11 is provided with a driving sprocket 13 by which the entire frame, including the vertical bar 10, may be oscillated. This vertical bar 10 carries the wire gripper (see Figs. 3 and 9) comprising a disc or roller 14 suitably mounted on an arm 15 extending from the bar 10. This disc is preferably grooved to receive the wire and mounted above the disc is a guide member 16 which is provided at one side with a downturned spur 17 and on the other side with an upturned spur 18. This guide member is provided with a stud 19 which passes through the disc 14 and the support 15 and to hold the parts in their assembled position and to provide a journal mounting for the element 14. Cooperating with this gripper disc 14 is a gripper dog 20 pivoted on a stud 21 on a lip 22 of the support 15 and offset from the disc 14. The free end of this dog is biased in a direction to engage the wire upon the periphery of the disc 14 and to this end, the pivot stud 21 is provided with an arm 23 having secured to one end thereof a biasing spring 24, the opposite end of which is anchored on the support 15.

Figures 15, 16, 17, 18, 19, 20:
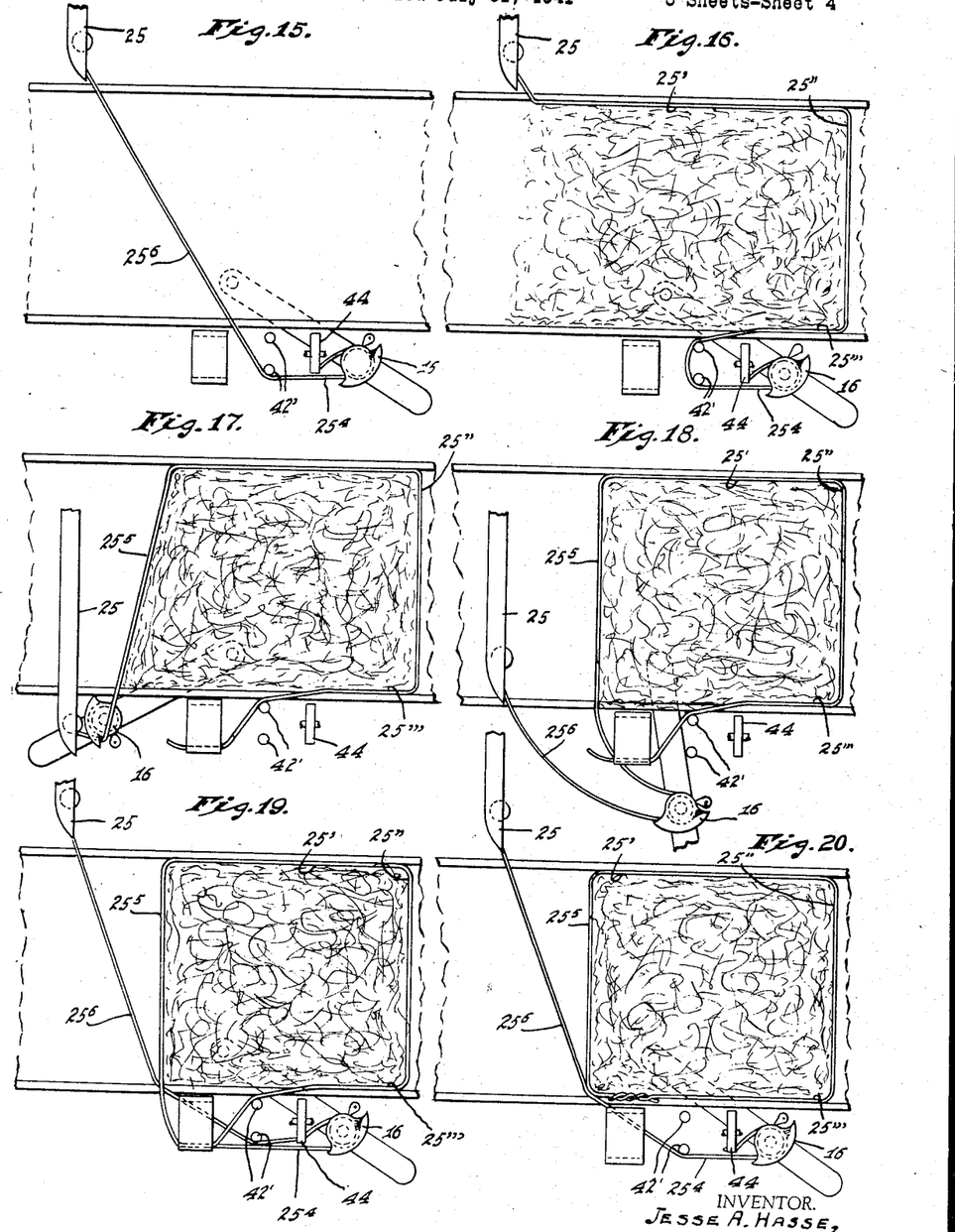
Figs. 15 to 20 are diagrammatic views, showing successive stages in the operation of the binding and tying mechanism.

As will be seen from an inspection of Figs. 1 and 3, the wire, which may be fed from a supply spool (not shown) is wrapped about a tension drum 26 for a purpose which will appear hereinafter, and thence is threaded through a needle 25 and over a roller 27 at the end of said needle. (See Fig. 13). From the needle end, the wire extends across the baling chamber to the gripper assembly, being bent about one of the two posts 42' and thence extending around the disc 14 beneath the guide 16, where it is engaged by the dog 20 in such fashion as to prevent movement of the wire in a clockwise direction with respect to the element 16 as viewed in Fig. 3. This condition of the parts is indicated in Fig. 15.

Associated with each wire gripper is a tie mechanism comprising a frame, (see Figs. 3, 11 and 12) between the side members 28 of which are rotatably mounted at opposite ends thereof, rotatable twisters 29 and 30. Each of these twisters preferably is in the form of a spur wheel provided with a radially extending slot or throat 30', the twisters 29 and 30 being provided with stub shafts which extend through openings in the side members 28 and on which the twisters 29 and 30 rotate. These twisters are driven by a gear 31 keyed on a shaft 32 which extends parallel with the baling chamber 2 and is driven from a driving mechanism 33 to be more fully hereinafter described.

The frame 28 is keyed on a sleeve 34 surrounding the shaft 32 and this frame is rotated from the driving mechanism 33 in a manner hereinafter more fully described.

Figures 11, 12:
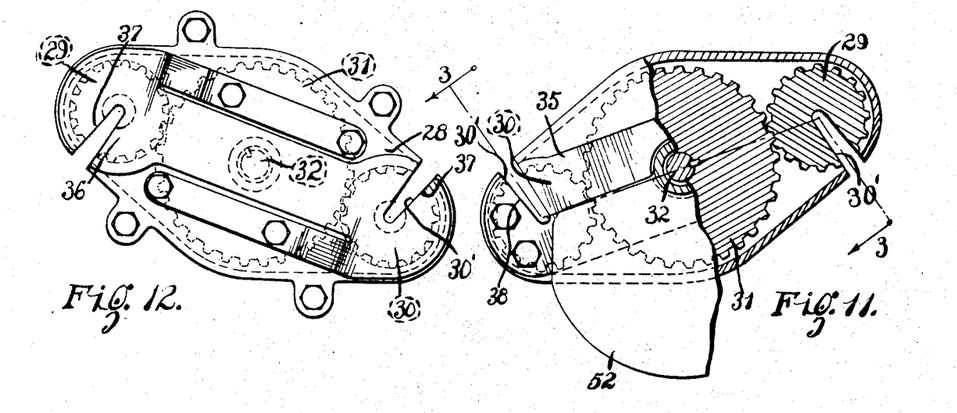
Fig. 11 is a detail section on the line 11,11 of Fig. 3.
Fig. 12 is an end elevation of the wire tie, looking in the opposite direction from that of Fig. 11.

Located on either side of the frame are wireholders 35 and 36 in the shape of side bars bolted to the frame and the bar 36 is provided at its ends with slots or throats 37 adapted to coincide with the slots 30' in the twisters 29 and 30. The bar 35 likewise has a pair of throats 38 in its opposite ends which also coincide with the slots 30' respectively in the twisters. These coinciding slots flare radially outwardly, as shown in Figs. 11 and 12, but near the axes of the twisters 29 and 30, they are all of just sufficient width to receive a single wire so that when a plurality of wires are laid in these slots, they lie in parallel side-by-side relation, upon a common radius of the associated twister. Therefore, when a pair of wires are lying in the stationary throats of the holders 35 and 36 and in one of the twisters, a rotation of the twister will twist the wires about one another to effectually tie these two wires together.

The sleeve 34 housing the shaft 32 is rotatably mounted in a bearing 41 carried by a bracket 42 mounted on the side of the baling chamber. This bracket has formed thereon a stationary cutter blade 43 and mounted on the rotatable sleeve 34 to rotate therewith is a revolving cutter blade 44 having a pair of cutting edges 45 and 46.

With the parts in the positions of Fig. 15, feed of material by the baling plunger will form a bale-embracing bight in the wire, as illustrated in Fig. 16, with one strand 25' of the wire extending substantially parallel to the line of bale movement on the rear side of the chamber, a second strand 25'' extending across the chamber in front of the bale, and a third strand 25''' extending rearwardly along the far side of the bale adjacent the tie mechanism. This strand 25''' loops over the posts 42' and extends forwardly to provide a strand $25^4$, the free end of which is held by the gripper.

Upon completion of the bale, the needle 25 is moved (by means later to be described) forwardly across the baling chamber forming a loop of wire extending across the chamber behind the bale, said loop comprising a strand $25^5$ lying adjacent the rear end of the bale and a strand $25^6$ which extends from the source of supply.

It is to be noted (Fig. 2) that the free end of the needle 25 lies substantially in the horizontal plane of the outwardly-facing mouth of the tie mechanism, and that the upper surface of the adjacent bar 2 of the baling chamber also lies substantially in that horizontal plane. Because of these facts, the strand $25^6$ of the wire, which is supported upon said bar surface, engages the post 42' at a point lying substantially in the horizontal plane of the said mouth of the tie mechanism. The strand $25^4$ leads, as is clearly shown in Figs. 3 and 9, from that point of engagement with the post 42' of the gripper, whence it extends beneath the guide member 16 and around the roller 14, being engaged between said roller and the dog 20.

At substantially the same time that the needle 25 is moved across the baling chamber to form the loop comprising the strands $25^5$ and $25^6$, the frame consisting of the upright 10 and the arm 11 is swung toward the rear of the baling chamber. Thus the strand $25^4$ is swung substantially about its stationary point at which it engages the post 42', and through an angle somewhat greater than 180 degrees, in a substantially horizontal plane. Because of the relative positions of the substantially stationary point of the strand $25^4$ and the outwardly presented mouth of the tie mechanism, this movement of the gripper lays a portion of the strand $25^4$ in that outwardly presented mouth of the tie mechanism. When the wire is laid in the twister slot it will have passed beneath the end of the locking lever 47 shown in Figs. 14 and 3. This lever is pivoted as at 48 on the side of the frame and biased into locking position by a coiled spring 49 all shown in Fig. 3. The wire now being held in the free end of the slot and gripped by lever 47, the arm 50 on lever 23 (see Fig. 9) will strike a stop member 51 (shown at the extreme left of Fig. 3) to swing the dog 20 in a clockwise direction to release its grip upon the wire.

It will be clear that, although the plane of the roller 14 is slightly below the horizontal plane of the outwardly presented mouth of the tie mechanism, the taut wire, engaging the post 42', as it does, in the plane of that mouth, will be laid in that mouth as the frame swings from the position illustrated in Fig. 3 to the opposite limit of its movement.

As the frame reaches that opposite limit of its movement, the guide 16 will engage beneath the loop comprising the strands 25⁵ and 25⁶, the spur 17 guiding the wire up over the upper surface of the guide 16, and the frame moving far enough so that the loop will slip over the spur 18. This condition of the parts is indicated in Fig. 17.

Figures 3, 4, 5, 6, 7, 8, 9, 10:
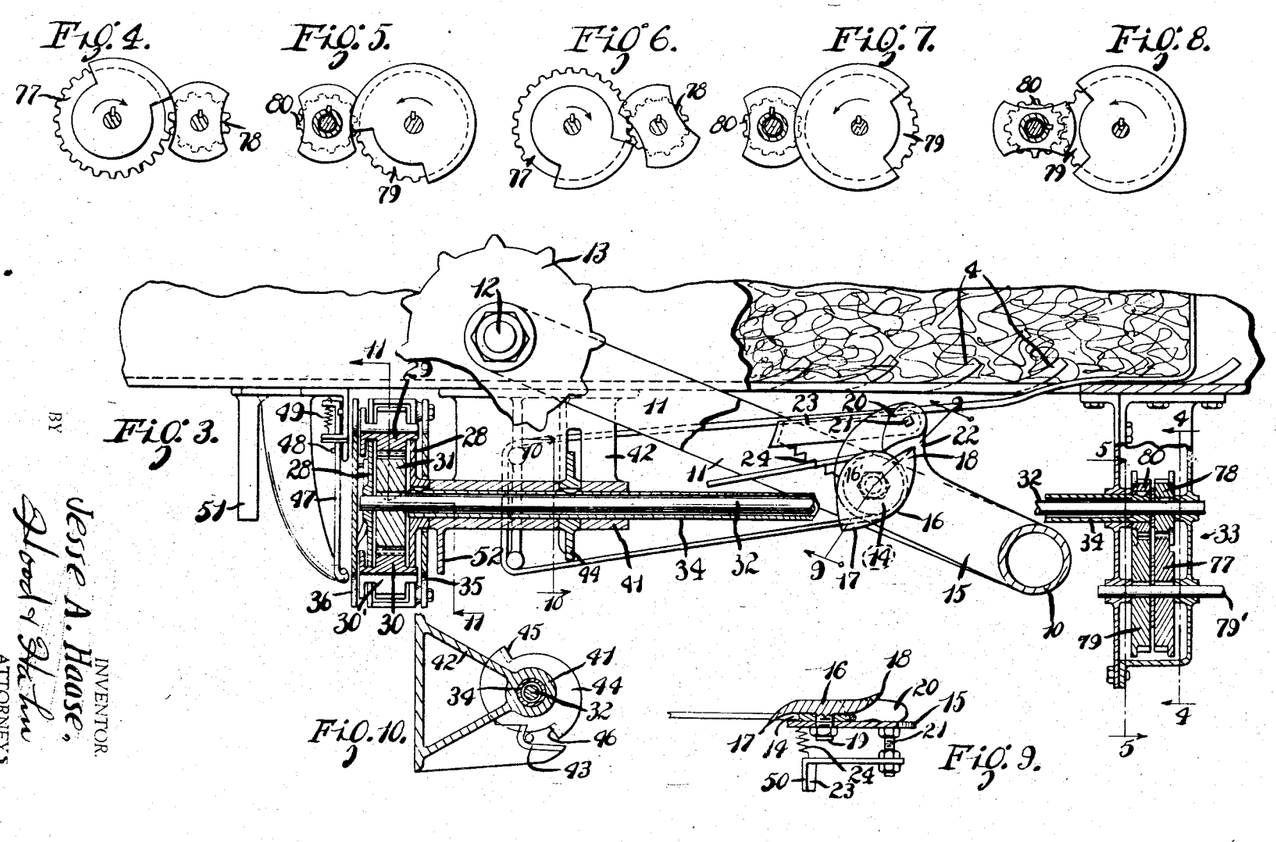
Fig. 3 is a detail plan, partially in section, of the tying mechanism.
Fig. 4 is a sectional view on the line 4,4 of Fig. 3 showing the driving gears for the tie mechanism in one position.
Fig. 5 is a sectional view on the line 5,5 of Fig. 3.
Figs. 6 and 7 are sectional views similar to Figs. 4 and 5, showing the driving mechanism in another position.
Fig. 8 is a sectional view similar to Fig. 5 showing the driving gears in still a further position.
Fig. 9 is a detail section on the line 9,9 of Fig. 3 showing the wire gripper.
Fig. 10 is a detail section on the line 10,10 of Fig. 3, illustrating the wire cutter.

As the upright 10 and its associated parts now starts to return toward the position illustrated in Fig. 3, the strand 25⁶ will lie beneath the guide 16, while the strand 25⁵ will lie upon the upper surface 16' of the guide 16. As the parts swing in a counter-clockwise direction from the position of Fig. 17, the wire will slide with respect to the gripper, and the strand 25⁵ will slip down across the sloping surface 16' and into the groove of the roller 14. Likewise, this movement of the parts carries the finger 23 away from the stop 51 to permit the dog 20 to move into contact with the wire. It will be clear, however, from an inspection of Fig. 3, that the dog will not operate to resist movement of the wire relative to the disc 16 in a counterclockwise direction, but will prevent relative movement in a clockwise direction. Thus, as the upright 10 swings from the position of Fig. 17 toward the position of Fig. 18, the gripper slides along the wire strand 25⁵, while drawing the strand 25⁶ through the needle 25.

By the projection of the needle 25 from the position of Fig. 16 to the position of Fig. 17, the strand 25⁵ has been pulled tightly across the baling chamber, bending about the "near" trailing corner of the bale. The point at which the wire is bent will, of course, lie in the horizontal plane occupied by the free end of the needle when the needle is in its retracted position of Figs. 1 and 15. The strand 25⁵ will lie substantially in that plane throughout its length, even while a portion thereof lies on the upper surface 16' of the guide member 16; and of course when the strand 25⁵ drops into the groove of the roller 14, the whole strand lies substantially in the plane previously occupied by the strand 25⁴. It is to be noted that, as the frame swings, toward the position of Fig. 3, the guide member 16 moves through a path considerably spaced from the outwardly opening mouth of the tie mechanism. Thus the strand 25⁵ is carried along the upper surface of said bar 2, which further tends to establish the horizontal position of the body of the strand 25⁵ substantially in the plane of the open mouth of the tie mechanism; and therefore the strand 25⁵ is laid in that mouth as the frame approaches the position of Fig. 3.

The strand 25⁶, as it is pulled through the needle by movement of the frame and gripper toward the position of Fig. 3, tends to follow the curved path of the gripper. Thus, the stiff, curved strand 25⁶, lying upon the side of the roller 14 opposite the strand 25⁵, is carried outwardly beyond the position of the tie mechanism, and as the frame moves past its position in which the arms 11 are perpendicular to the adjacent side of the baling chamber, the strand 25⁶ tends to stand outwardly beyond the mouth of the tie mechanism in the manner indicated in Fig. 18. For these reasons, the strand 25⁶ does not enter the tie mechanism mouth.

As the frame, including the upright 10, moves to its final position (of Figs. 3, 15 and 19), the needle 25 is retracted. Thus the portion of strand 25⁶ which, at the time illustrated in Fig. 18, stood outwardly in a curve, is drawn rearwardly beneath the tie mechanism in the manner shown in Fig. 19. This wire portion readily rides beneath the tie mechanism because of its tendency to droop somewhat of its own weight while standing out in the position of Fig. 18.

Suitable mechanism later to be described now drives the shaft 32 to spin the twister 30 to twist together the strands 25⁴ and 25⁵. As that twisting is completed, the sleeve 34 is rotated, whereby the knife 44 is caused to sever the strand 25⁵, and the tie mechanism side members 28 are rotated through 180 degrees, whereby the stationary cam 52 will be caused to force the tied strands out of the twister mouth, and the mouth of the twister element 29 is brought into position to receive the wire strands for the next cycle of operation. The parts now stand in the condition illustrated in Fig. 20, and the completed bale is moved on as a new bale is started by material forced into engagement with the strand 25⁶.

Each of the needles 25 is carried, at its rear end, on a reciprocating frame 53 and is guided at its forward end through a suitable guide member 54. A coiled spring 55, surrounding each of the needles and bearing on the guide member 54, biases the needles and their frame 53 toward a retracted position. The frame is moved to move the needles to a projected position through the medium of a drive mechanism comprising a reciprocating plunger 56 connected through the medium of a cable 57 with the frame 53. This plunger is slidably mounted in a pivoted guide 58 pivoted at 59 on one side of the baling machine, and the plunger 56 is provided with an upturned hook 60. A second reciprocating plunger 61 is connected by a connecting rod 62 with a crank 63 on one of the shafts of the drive wheels 7 so that, as the drive wheels rotate, this crank 62 will operate the reciprocating plunger 61. This plunger 61 is provided with a downturned hook 64 so arranged that when the end of the plunger 56 is in its raised position, the hook 64 will engage the hook 60, to move the plunger 56 to the left, looking at Fig. 2, thus shifting the needles to carry the baling wire across the baling chamber. The retractile movement of the needles is effected, as heretofore explained, by the coiled springs 55. The plunger 56 is raised into position to be engaged by the hook 64 through the medium of a cam 65 which is mounted on one end of a shaft 66. This shaft (see Fig. 1) is driven through suitable bevel gearing 67 from a shaft 68 carrying at its end a gear 69 in turn meshing with a gear 70 on the shaft of the tension drum 26. It is to be remembered that the wire feeds from its supply spool and over the tension drum 26. Each time the baling plunger 5 moves forward to add material to the bale, the growth of the bale pulls some wire from the supply spool, thus rotating the drum 26 and thereby rotating the shaft 48, the shaft 66, and the cam 65.

The timing of this movement is such that the cam 65 will reach its position such as to cause the hooks 60 and 64 to engage at the period when the bale is completed and the baling plunger 5 is moving to its retracted position. It is to be noted that with the movement of the baling plunger to its retracted position, the plunger 61, and with it the plunger 56, will be moved to the left, looking at Fig. 2, thus projecting the needles across the baling chamber as the baling plunger is retracted.

The sprocket 13, which is driven to oscillate the frame comprising the vertical rod 10 and the levers 11, is driven through the medium of a chain 71 which connects the sprocket 13 with a driving sprocket 72. This driving sprocket is oscillated by a crank arm 73 pivotally connected at 74 with one end of a link 75 having its other end connected as at 76 with the frame 53. Therefore, as the frame 53 is reciprocated to project the needles forward and backward across the baling chamber, the frame carrying the grippers for the free end of the wire is oscillated to swing the free end of the wire into the tie and pick up another portion of the wire to carry forward again.

The drive mechanism for the sleeve 34 and the shaft 32 comprises two sets of Geneva gears, (see Figs. 3 to 8) one set comprising the driving gear 77 and the driven gear 78, the driven gear being keyed to the shaft 32. The position of these gears, when the tie is completed and the parts are ready for a new tie is illustrated in Fig. 4. The second set of driving gears consists of the driving gear 79 and the driven gear 80 which driven gear is keyed to the sleeve 34; and when the gears 77 and 78 are in the positions illustrated in Fig. 4, these gears 79 and 80 will be in the positions illustrated in Fig. 5. By the time the wires have been laid in the tie throats and at the beginning of the twisting action, the gears 77 and 78 will assume the positions illustrated in Fig. 6, while the gears 79 and 80 will be in the positions illustrated in Fig. 7; and after the tie is completed and the tie mechanism is being turned to throw the tie wires out of the tie mechanism, the gears 79 and 80 will be in the positions illustrated in Fig. 8. The two gears 77 and 79 are driven from a shaft 79' which in turn is driven, through a single-revolution clutch of standard construction (not shown) tripped by bale growth in a manner well understood in the art, from a suitable bevel gearing train (see Fig. 2) indicated generally at 81 and driven from the shaft 82 of the driving motor, which motor is not only adapted to drive this shaft but may also drive the baling mechanism.

Figure 22:
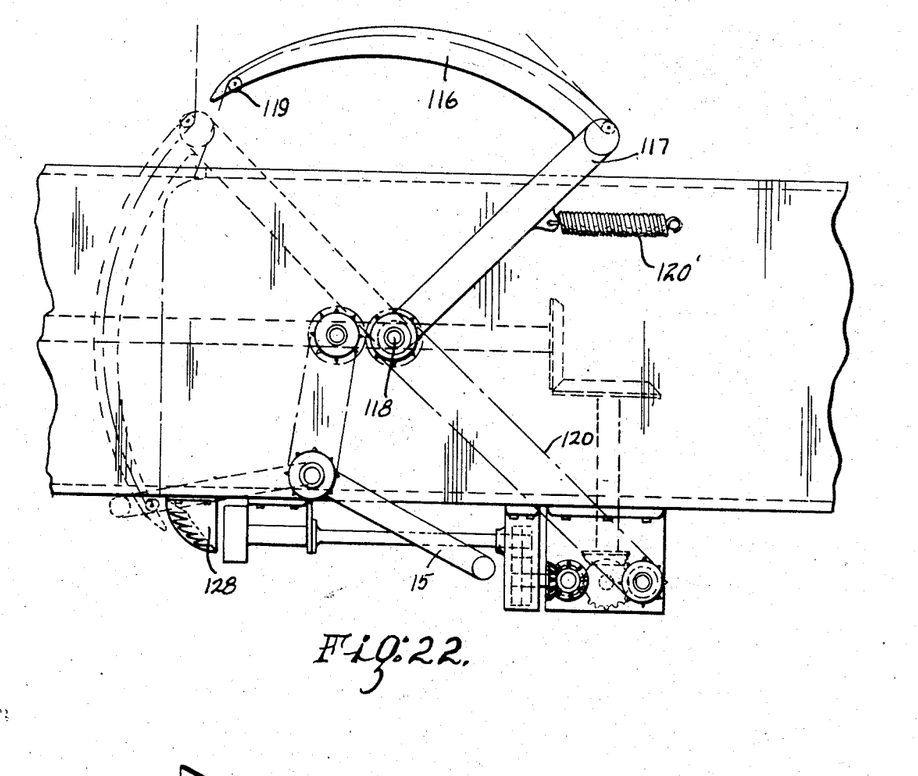
Fig. 22 is a partial plan view showing a modified form of wire needle.

In Fig. 22, I have illustrated a modified form of the needle for threading the baling wire across the baling chamber. In the structure illustrated in Fig. 1, the needle 25 reciprocates with a right-line movement across the baling chamber. In the structure illustrated in Fig. 22, the needles 116 are arcuate in shape and are mounted at one end of an oscillating arm 117 pivoted at 118 on a shaft extending upwardly from the top of the baling chamber. These needles, at their feeding ends, are provided with rollers 119 over which the wires from the feeding spools are adapted to pass. The arm 117 is oscillated through the medium of a driving chain 120 in one direction and returned to its retracted position through the medium of a coiled spring 120' having one end fastened to the arm 117 and the opposite end anchored on the baling chamber. In this arrangement, the needles 116 in their retracted position lie somewhat parallel to the side wall 2 of the baling chamber and as the arm 117 is swung, the needles 116 are swung in an arc from the position shown in full lines in Fig. 22 to the position illustrated in dotted lines in said figure, feeding the baling wires across the baling chamber in the same manner as does the needle 25 in the structure illustrated in Fig. 1.

Figures 21, 23:
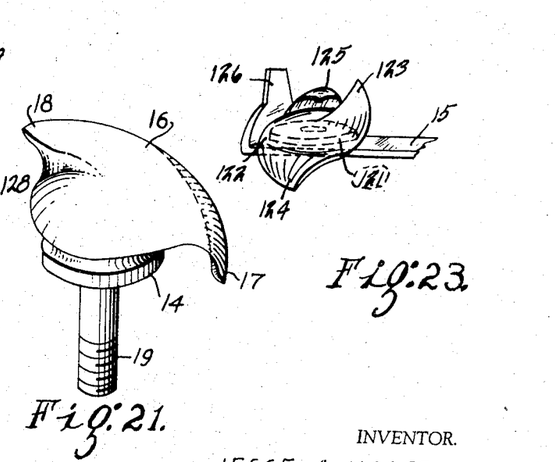
Fig. 21 is a perspective view of the wire gripper.
Fig. 23 is a perspective view showing a modification of the wire gripper illustrated in Fig. 9.

In Fig. 23, I have illustrated a modified form of wire gripper adapted to be mounted on the oscillating arm 15. In this structure, I provide on the arm 15 a disc 121 similar in structure and function to the disc 14 shown in Fig. 9. Above this disc is a guide member 122 similar to the guide member 16 and having the upturned guide finger 123 and the downturned guide finger 124. Associated with the upturned guide finger 123 is an overhanging finger 125 carried by the arm 15, slightly spaced from the guide member 122, and so arranged that as the arm 15 swings from the full line position to the dotted line position (Fig. 22), the guide finger 124 will pass beneath the wire, causing the same to slide up over the guide finger 123 and down in front of the finger 125. As the arm 15 swings back toward its full line position, the wire will be bent around the end post 126 on the arm 15 and due to the holding action of the finger 125, the wire will be kinked sufficiently to be firmly gripped by the gripper mechanism shown in Fig. 23 and pulled through the baling chamber and laid in the tie mechanism.

As the wire is swung with the arm 15, the arm moving from the full line position to the dotted line position and held by the gripper of the type illustrated in Fig. 23, the strand of wire is laid on an arm 127 extending beyond a plate 128 provided with an upturned flange 129 by which said plate may be secured to the side of the baling chamber. Overhanging the arcuate arm 127 is a plurality of upwardly inclined resilient fingers 130 having downturned ends 131 and as the wire is laid on the arm 127, it passes beneath the spring fingers 130. The end 132 of the plate or arm 127 is upturned so that as the arm 15 swings back to its normal position after having laid the initial strand in the tie member, the wire will pass beneath the plate 132 forming a loop and laying the second strand of the loop in the tie member, substantially as is done in the structure illustrated in Fig. 3.

Figures 1, 14:
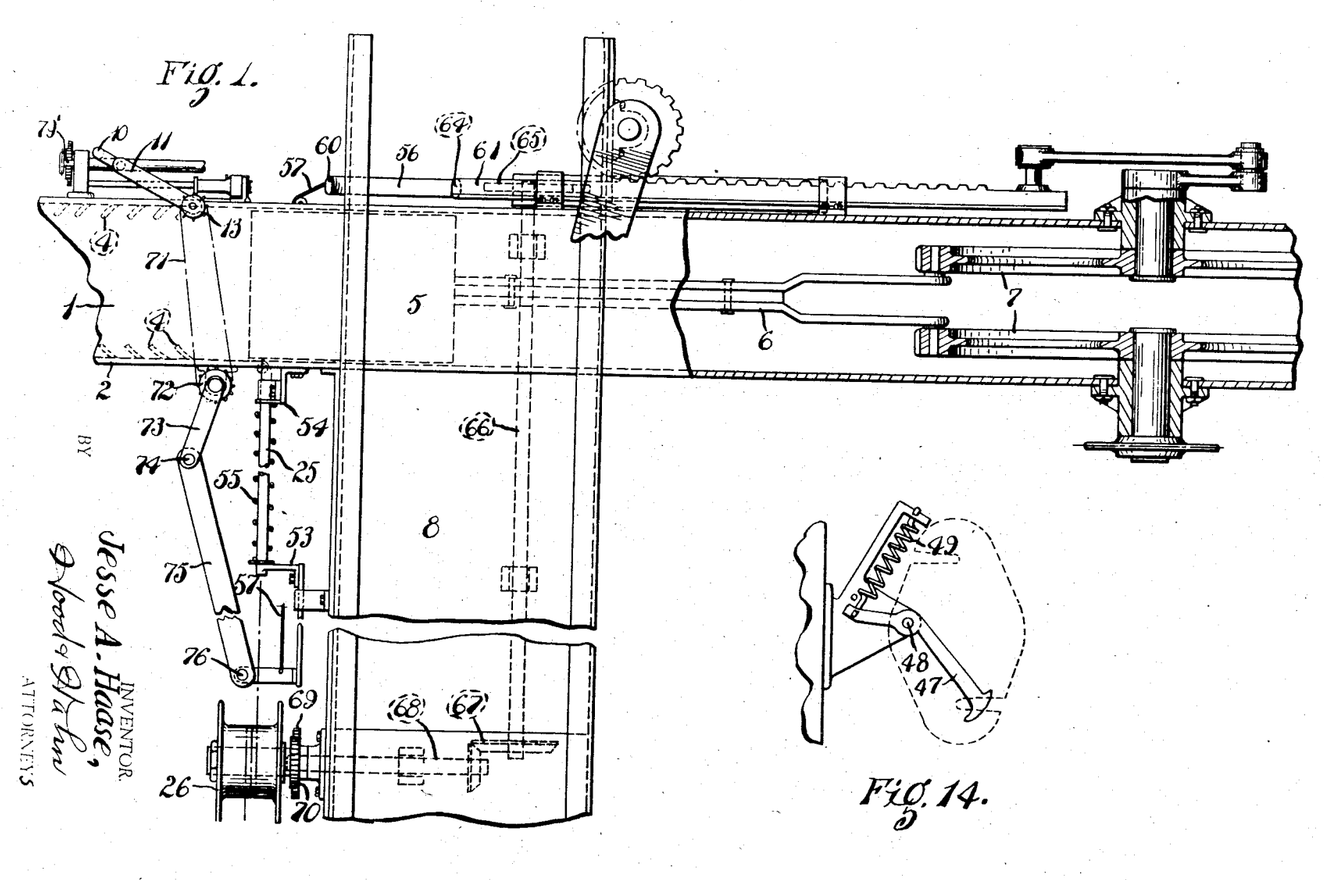
Fig. 1 is a plan view of a baling machine, or so much thereof as is necessary for the purpose of illustration, embodying my invention.
Fig. 14 is a detail end view of the wire holder.
Figure 2:
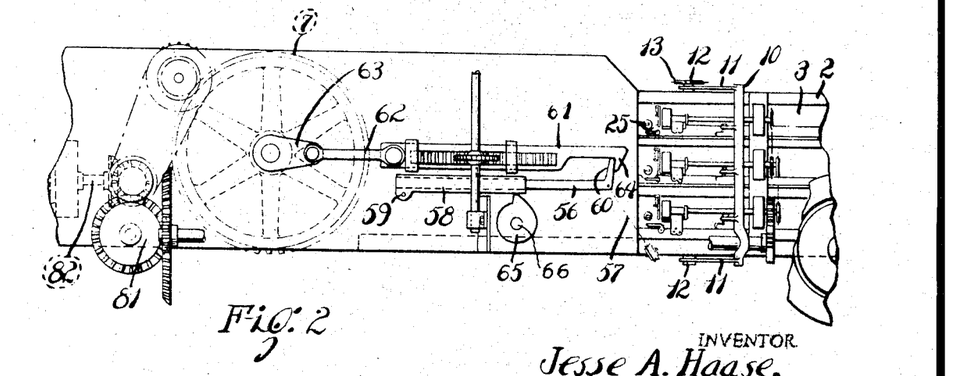
Fig. 2 is a partial side elevation of the machine illustrated in Fig. 1 and viewed from the upper side of that Figure.
Figure 24:
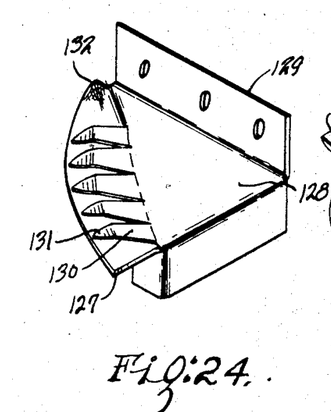
Fig. 24 is a perspective view of a modification of the wire holder illustrated in Fig. 14.

The structure illustrated in Fig. 24 takes the place of the holder illustrated in Fig. 14 and accomplishes the same result, while dispensing with a number of moving parts.

The present application is a continuation in part of my application filed July 3, 1940, Serial No. 343,723.

I claim as my invention:

1. In a baling machine, the combination with a baling chamber and a reciprocating plunger operating therein, of a wire gripper arranged on one side of said chamber, a wire feed arranged on the opposite side of said chamber and movable across the chamber to feed a strand of wire to said gripper, means for feeding the material to be baled into said chamber in advance of said plunger and behind said wire strand whereby, when one end of the wire is gripped by the gripper, the strand will be fed forwardly in the baling chamber in advance of the material to be baled to form a bight enclosing the material to be baled, a wire tie mechanism arranged adjacent said gripper, means for oscillating said gripper longitudinally of said baling chamber to move the end of the wire gripped thereby into said wire tie mechanism and to cause said gripper to engage a strand of wire projected across the baling chamber, said gripper, when oscillated in an opposite direction, moving said second-mentioned strand into said wire tie mechanism to be tied to the first mentioned strand, means for operating said tie mechanism, and means for severing the tied wire from the source of supply.

2. In a baling machine, the combination with a baling chamber and a reciprocating plunger operating therein, of a wire gripper arranged on one side of said chamber, reciprocating wire feeding means arranged on the opposite side of said chamber and reciprocating across the chamber to project a wire strand across the same into a position to be engaged by said gripper, a wire tie mechanism arranged adjacent said gripper, means for oscillating said gripper longitudinally of said baling chamber in one direction to engage the wire strand projected by said feeder and in an opposite direction to form a loop in said wire strand and position one strand of said loop in said tie mechanism, means for operating said tie mechanism to secure said strand to the free end of said wire, and means for severing said strand after the tie has been made to leave the other strand held by said gripper.

3. In a baling machine, the combination with a baling chamber and a reciprocating plunger operating therein, of a wire tie mechanism arranged on one side of said chamber, a reciprocating needle arranged on the opposite side of said chamber and adapted to project a wire loop across the baling chamber, one strand of said loop surrounding the bale and having a free end in said tie mechanism, a gripper oscillating longitudinally of said baling chamber adapted to engage the bight of the loop and move a portion thereof into said tie mechannsm, means for operating the tie mechanism to secure the free end of said loop and said portion together, and means for severing said portion between the tie and gripper to thereby leave the other side of said loop with a free end in said gripper.

4. In a baling machine, the combination with a baling chamber and a reciprocating plunger operating therein, of a tie mechanism arranged on one side of said chamber having a rotatable member provided with a wire receiving throat, a stationary tie member having a wire receiving throat adapted to normally coincide with the throat of said rotatable member, a reciprocating needle adapted to project a wire loop across the bale chamber, a gripper oscillating longitudinally of said chamber adapted when moved in one direction to lay a free end of a bale wire in said coinciding throats and to engage said loop, and when moved in an opposite direction, to lay one side of said loop in said throats in parallel with the free end of the wire, means for rotating the rotating member of said tie mechanism to twist the parallel wires together, and means for severing said wire between the gripper and the tie mechanism.

5. In a baling machine, the combination with a baling chamber and a reciprocating plunger operating therein, of means for projecting a loop of wire across said chamber from one side thereof, a tie mechanism on the opposite side of said chamber, an oscillating gripper oscillating in one direction to feed a free end of said wire into said tie mechanism and movable to engage a strand of said loop, means for opening said gripper as it lays the free end of the wire in said tie mechanism and to position the same to receive a strand of said loop, said gripper oscillating in the opposite direction to lay said strand in said tie mechanism, and means for closing said gripper as it moves in said opposite direction.

6. In a baling machine, the combination with a baling chamber and a reciprocating plunger operating therein, of a wire tie mechanism arranged on one side of said chamber including rotating and relatively stationary slotted tie members having their axes parallel with the side of the chamber and provided with radially extending slots, a wire gripper movable back and forth longitudinally of the bale chamber and adapted to grip the free end of a tie wire extending across the bale chamber, a reciprocating feed needle for projecting a loop of wire across said baling chamber with one strand of said loop lying adjacent the completed bale in said chamber and the other strand extending from a source of supply, said gripper in its retractile movement carrying the free end of the wire rearwardly and into parallel relationship with the completed bale for entry into the slots of the tie mechanism and gripping said needle loop and on its projectile movement carrying said loop forwardly with the strand adjacent the bale in parallelism with the free end strand and in a position for engagement with the slots of said tie mechanism and means for severing said last-mentioned strand between the tie mechanism and the gripper.

7. In a baling machine, the combination with a baling chamber and a reciprocating baling plunger operating therein, a wire gripper disposed on one side of said chamber gripping the free end of a wire extending across said chamber and movable longitudinally back and forth of said chamber and holding said free end while said gripper is in its projected position, a feeding needle reciprocating across the baling chamber from the side thereof opposite said gripper and projecting a wire loop across said chamber with one strand adjacent the rear end of a formed bale and the other extending from a source of supply, said grippei moving rearwardly of the baling chamber and in said movement laying the free end of the wire parallel with the bale and at the completion of its movement gripping said needle loop and in its forward movement laying the strand adjacent said bale parallel with the bale and the free end strand, means for tying said parallel strands and means for severing the tied wire from the source of supply.

8. In a baler, the combination with a baling chamber and a reciprocating plunger operating therein, of a feed needle reciprocating across said baling chamber and projecting a loop of wire across said baling chamber, a tie mechanism disposed on the opposite side of said chamber from a normal position of said needle and including a rotary member having rotary and stationary members having wire receiving slots and having their axes parallel with the side of the baling chamber, a gripper oscillating in a plane parallel to the top of the baling chamber and in its projected position holding the free end of a wire loop extending parallel to the side of the bale with a continuation of the inner strand of said loop forming one side of a bight embracing the bale, the oppostie side of said bight extending over said needle and to the source of supply, said needle being projectible across the chamber to carry its before mentioned loop across the chamber with one side of the loop adjacent the rear end of a completed bale, said gripper being oscillable from its projected position to its retracted position to lay the free strand of its loop in the wire receiving slots of said tie mechanism and engage a strand of said needle loop and on its return movement to its projected position to lay said needle loop strand in said tie mechanism, said rotating member of the tie mechanism being adapted, when rotating, to tie the portions of the wire therein, and means for severing said needle strand between said gripper and said tie mechanism.

9. In a baling machine, the combination with a baling chamber and a reciprocating plunger operating within said chamber, a wire gripper disposed on one side of said chamber and movable longitudinally thereof and gripping the free end of a wire strand extending across the bale chamber from a source of supply, said gripper being movable from its holding position longitudinally of the bale chamber toward the rear of said chamber and positioning a strand of wire in a position to be received by a wire tie mechanism and movable longitudinally forward of the bale chamber to carry a strand of a wire loop into parallelism with said first-mentioned strand, and a wire tie mechanism receiving said parallel strands and operable to wrap said strands into a tie.

10. In a baling machine, the combination with a baling chamber and a reciprocating plunger operating therein, of a wire tie mechanism disposed on one side of said chamber and longitudinally stationary relatively thereto, a wire gripper having a back and forth movement longitudinally of said baling chamber and gripping the free end of a wire strand extending across the bale chamber from a source of supply and movable from its holding position longitudinally of the bale chamber toward the rear of said chamber and in said movement moving inwardly toward said wire tie mechanism for laying said free end in said wire tie mechanism and adapted to engage a transversely extending wire loop and, in its longitudinal movement toward the front of said chamber, to move a strand of said transversely extending loop into said wire tie mechanism, said wire tie mechanism being adapted to tie the two strands received thereby, and means for severing the tied wire from said last-mentioned loop.

11. In a baling machine, the combination with a baling chamber and a reciprocating plunger operating therein, of a wire tie mechanism disposed on one side of said chamber and longitudinally stationary relatively thereto, a wire gripper disposed on the same side of said chamber and swingable longitudinally back and forth of said chamber in an arc, the rear end of said arc lying within the outer extremity of said tie mechanism, said gripper being adapted in its swinging movement rearwardly of the chamber to lay the free end of the wire strand gripped thereby in said tie mechanism and in its forward swinging movement to lay one strand of a wire loop projecting across the baling chamber in said tie mechanism.

12. In a baling machine, the combination with a baling chamber and a plunger reciprocating therein, of a wire tie mechanism disposed on one side of said chamber and comprising a frame rotating on an axis parallel with the baling chamber, rotary and stationary slotted tie members supported at each end of said frame, the slots at one end of said frame opening away from said baling chamber and the slots at the other end of said frame opening toward said baling chamber, means for laying parallel baling wires in the slots of the tie members opening away from the baling chamber, means for rotating the rotary slotted members for twisting the wires to form a tie, and means for rotating the frame to face the slots containing the twisted wires toward said baling chamber and to position the slotted members carried by the opposite end of said frame with their slots opening away from the baling chamber to receive another set of parallel baling wires.

13. In a baling machine, the combination with a baling chamber having a reciprocating plunger operating therein, of a tie frame disposed on one side of said chamber and extending substantially at right angles thereto and swingable on an axis parallel with said chamber, rotary and relatively stationary slotted wire-receiving members mounted adjacent an end of said frame, said frame being swingable on its axis to position the slotted tying members with their slots opening away from the chamber for the reception of wires for tying purposes, means for laying parallel tie wires in the slotted members, means for operating the rotary slotted members for tying the wires, said frame being swingable after the completion of a tie to position said tying members with their slots opening toward the bale baling chamber, and means for ejecting the tied wires from the slotted members when the frame is swung toward said last-mentioned position.

14. In a baling machine, the combination with a baling chamber and a reciprocating plunger operating therein, of a tie mechanism disposed on one side of said chamber and longitudinally stationary relatively thereto having rotary and stationary slotted members axially parallel with the side of said chamber and disposed forwardly beyond the rear end of a completed bale formed in said chamber, a loop post positioned forwardly and beyond said tie, a wire gripper movable back and forth longitudinally of said chamber and when in its projected position holding the free end of a bale tie wire strand with said strand extending rearwardly behind said loop post and across said baling chamber whereby when a bale is completed, said strand will extend rearwardly from said gripper over said loop post, forwardly parallel with the completed bale, across said chamber in front of the bale and rearwardly to a source of supply at the rear of the bale, a reciprocating needle projecting a loop in said wire across the baling chamber with one strand lying adjacent the rear end of said bale and the other strand extending from the source of supply, said gripper oscillating in an arc from front to back of said chamber to lay the free end of said first-mentioned loop in the slots of said tie mechanism and grip a strand of said second-mentioned loop, and swingable in an arc forwardly of said chamber to lay one strand of said needle loop in the slots of said tie mechanism and carry the other strand of said needle loop forward beyond said loop post, means for operating said tie mechanism to tie the strands of wire together, and means for severing the wire between said tie mechanism and said gripper.

15. In a baling machine, the combination with a baling chamber and a baling plunger operating therein, of a wire gripper movable back and forth longitudinally of said chamber, a wire tie mechanism disposed on one side of said chamber and a loop post intermediate the extremities of movement of said gripper, said gripper in its projected position holding the free end of a wire loop passing over said post and having one strand extending rearwardly of the baling chamber and the other strand extending forwardly of the baling chamber, said gripper moving rearwardly to swing said forwardly projecting strand rearwardly into a position to be engaged by said wire tie mechanism.

JESSE A. HAASE.

CERTIFICATE OF CORRECTION.

Patent No. 2,355,644. August 15, 1944.

JESSE A. HAASE.

It is hereby certified that error appears in the printed specification of the above numbered patent requiring correction as follows: Page 6, second column, line 19, claim 13, strike out the word "bale"; and that the said Letters Patent should be read with this correction therein that the same may conform to the record of the case in the Patent Office.

Signed and sealed this 3rd day of October, A. D. 1944.

(Seal)

Leslie Frazer

Acting Commissioner of Patents.